Figure 1:
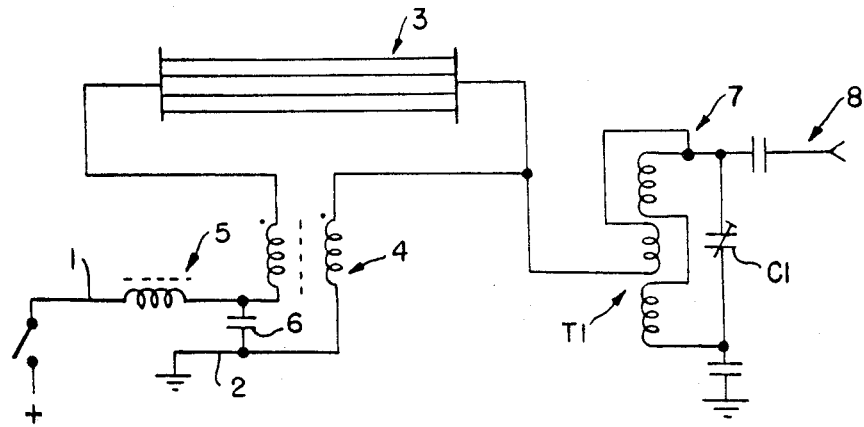

United States Patent [19]

Kropielnicki

[11] Patent Number: 4,583,097
[45] Date of Patent: Apr. 15, 1986

[54] ELECTRICAL SIGNAL SEPARATING DEVICE

[75] Inventor: Jerzy J. Kropielnicki, Knutsford, England

[73] Assignee: BSH Electronics (Manchester) Limited, Manchester, England

[21] Appl. No.: 561,982

[22] Filed: Dec. 16, 1983

Related U.S. Application Data

[60] Division of Ser. No. 359,304, Mar. 18, 1982, Pat. No. 4,422,077, which is a continuation of Ser. No. 105,232, Dec. 19, 1979, abandoned, which is a continuation of Ser. No. 933,289, Aug. 14, 1978, abandoned.

[30] Foreign Application Priority Data

Aug. 17, 1977 [GB] United Kingdom ............... 34443/77

[51] Int. Cl.$^4$ .................... H01Q 1/02; H01Q 1/32
[52] U.S. Cl. .................................................. 343/704
[58] Field of Search ................... 343/704, 712, 713

[56] References Cited

U.S. PATENT DOCUMENTS 3,484,584 12/1969 Shaw .................................. 343/704

FOREIGN PATENT DOCUMENTS 2735278 2/1978 Fed. Rep. of Germany ...... 343/704

Primary Examiner—Eli Lieberman
Attorney, Agent, or Firm—Shoemaker and Mattare, Ltd.

[57] ABSTRACT

An electrically heated window, for example, a motor vehicle heated rear window, is provided with a signal separating device to enable the heating element of the window to be used simultaneously as a transmitting aerial and for heating purposes.

7 Claims, 6 Drawing Figures

ELECTRICAL SIGNAL SEPARATING DEVICE

The present application is a divisional of application Ser. No. 359,304, filed Mar. 18, 1982, now U.S. Pat. No. 4,422,077, which is a continuation of application Ser. No. 105,232, filed Dec. 19, 1979, now abandoned, which is a continuation of application Ser. No. 933,289, filed Aug. 14, 1978, now abandoned.

This invention relates to an electrical signal separating device for separating a radio signal from the heating element of an electrically heated window whereby for example a heated rear window of a motor vehicle can be used simultaneously for heating purposes and as a radio aerial, such motor vehicle electrically heated window not designed specifically to be an antenna or aerial, and, therefore, essentially aperiodic and non-resonant at specific or VHF frequencies of use.

In the specification of our earlier British Pat. No. 1,520,030 there is specifically described an electrical signal separating device of the above mentioned kind for use with a motor car heated rear window to enable same to be used as a receiving aerial for a car radio. Such electrical signal separating device is also described in applicant's issued U.S. Pat. No. 4,086,594, which is incorporated herein by reference.

In accordance with the present invention, which is an improvement in or modification of the invention of said earlier patent, it is now proposed to use an electrical signal separating device of the above mentioned kind with an electrically heated window such as to enable said window to be used as a transmitting aerial.

With this arrangement, in the case where the heated window is a motor vehicle heated window, said window can be used as the aerial for a portable or mobile transmitter carried by or used within or in the vicinity of the motor vehicle.

The transmitter may be a short range communications transmitter such as a "Citizens Band" transmitter, or a transmitter used by police or other emergency services, or a transmitter used by taxi, security or transport organisations, or a radio-telephone transmitter, or a transmitter used in any other suitable context.

Alternatively, or additionally, the transmitter may be a long range transmitter, for example, a mobile amateur radio communications transmitter.

The transmitter may be used in conjunction with a receiver in a two-way communications system in which case the said window may act as the receiving aerial as well as the transmitting aerial. It is however possible to use a separate receiving aerial, if desired. Also, if desired, the transmitter may be used alone, without a receiver, for example, for one-way communications.

Whilst it is visualised that the invention will find particular application in the context of communications it is to be understood that the invention is not restricted to this field and may instead apply to the transmissions of warning signals, control signals, information or the like.

With regard to the construction of the signal separating device, this may be of similar form to the device described in the aforementioned patent particularly with regard to the provision of a bifilar coil which offers negligible resistance to heavy direct currents but efficiently rejects RF signals even in the case where RF signals are fed to the coil simultaneously with passage of heavy direct currents therethrough.

The bifilar coil may be air-cored or may be provided with a ferrite core or a metal core. For short wave transmissions a ferrite core is preferred.

Alternatively, separating arrangements other than such bifilar coil may be used preferably involving air-gapped coils.

An appropriate matching network may be incorporated in said signal separating device for matching the aerial to the transmitter.

In one embodiment of the invention the signal separating device may be controlled so as to be suitable for use both as a transmitting aerial at an appropriate communications wavelength, and also as a receiving aerial for receiving transmissions at usual AM and/or FM wavelengths. In this way, for example, a car heated rear window can be used both as a receiving aerial for a car radio and also as a transmitting/receiving aerial for a communications transmitter/receiver used in the car. In this context, the circuit of the signal separating device may incorporate two bifilar coils or other separating arrangements appropriate to the two operating wavelength ranges, and also appropriate protective circuitry and the like.

The invention will now be described further by way of example only and with reference to the accompanying drawings in which:

FIGS. 1 to 6 which are circuit diagrams of different signal separating devices according to the invention.

With the embodiment of FIG. 1, two supply leads 1, 2 for a motor car heated rear window 3 have interposed therein the two windings of a ferrite-cored bifilar coil 4 and also a choke 5. A capacitor 6 is connected between the leads 1, 2 after the choke 5 and before the bifilar coil 4.

One of the leads 2 is connected, after the bifilar coil 4 and before the heating element of the window 3, to an aerial matching circuit 7 which in use is connected at a terminal 8 thereof to the aerial connection of a transmitter/receiver and, as clearly depicted in FIG. 1, the leads connecting the bifilar coil 4 with the heating element of the window 3 act as power output leads for the motor vehicle D.C. power supply.

In use, the heated rear window 3 acts as an aerial for the transmitter/receiver, even in the case where the heated rear window is operatively connected to a D.C. supply and a heavy direct current is flowing through the heating element. In this respect, the bifilar coil 4 allows passage of the direct current but acts efficiently to isolate radio signals from the supply circuit. A more detailed discussion of the operation of the bifilar coil is given in the aforesaid British Pat. No. 1,520,030.

With the circuit arrangement of FIG. 1 it will be apparent that the aerial 3 acts as a capacitive impedance of r.f. signals. The matching circuit 7, as can be seen, incorporates a transformer T1 and a variable capacitor $C_1$. The variable capacitor is used to tune the circuitry so that the capacitive impedance appears as a resistive impedance which is matched to the transmitter aerial feeder circuitry connected to the terminal 8 by the transformer T1.

With the arrangement described above, a heated rear window can be used as an efficient transmitting/receiving aerial whereby problems involved in the use of an external car aerial of the whip kind can be avoided. Further, the signal separating device used to convert the window for use as an aerial is of simple and inexpensive construction and also can be of a small sized, compact nature.

Figure 2:
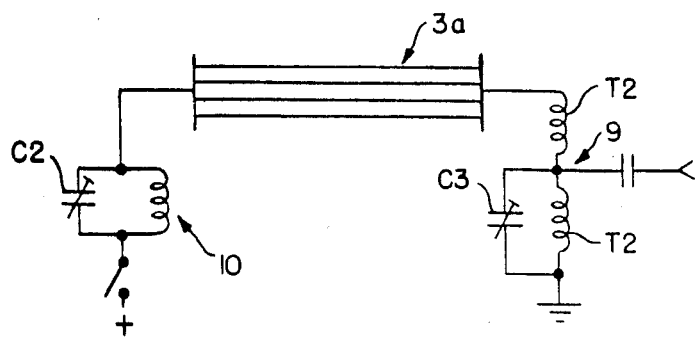

With the arrangement of FIG. 2, an aerial matching circuit 9, similar to the arrangement 7 of FIG. 1, is provided, but instead of the bifilar coil 4, the power supply is connected to the heated rear window 3a via a parallel inductance/capacitance tuned circuit 10 in one lead and via the circuit 9 in the other lead.

The circuits 9, 10 are tuned (by means of the variable capacitors $C_2$, $C_3$) to present a high impedance to r.f. signals. The r.f. signals are thereby isolated from the supply circuit. The capacitive impedance of the aerial 3a is matched to the resistive impedance of the transmitter aerial feeder circuitry by means of the transformer T2 and the variable capacitor $C_3$ of the circuit 9.

Figure 3:
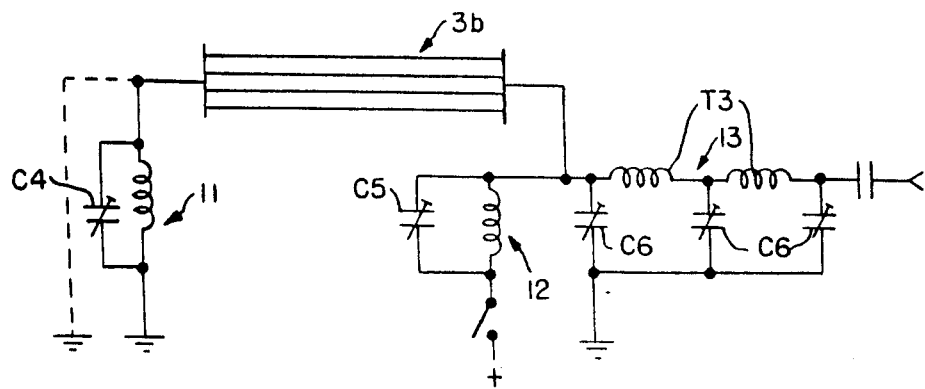

With the arrangement of FIG. 3, the power supply is connected to the heated rear window via two parallel tuned circuits 11, 12 although alternatively if desired, and as shown in dotted lines, one side of the window may be connected direct to earth so that RF signals as well as the D.C. circuit are earthed at such side of the window. The other side of the window is connected to the aerial connection via an impedance matching circuit 13 which comprises one or a plurality of coils (two are shown by way of example in the drawing) with intermediate adjustable capacitors.

The circuits 11, 12 are tuned (by means of the variable capacitors $C_4$, $C_5$) to present a high impedance to r.f. signals. The r.f. signals are thereby isolated from the supply circuit. The capacitive impedance of the aerial 3b is matched to the resistive impedance of the transmitter aerial feeder circuitry by means of the transformer T3 and the variable capacitors $C_6$ of the circuit 13.

Figure 4:
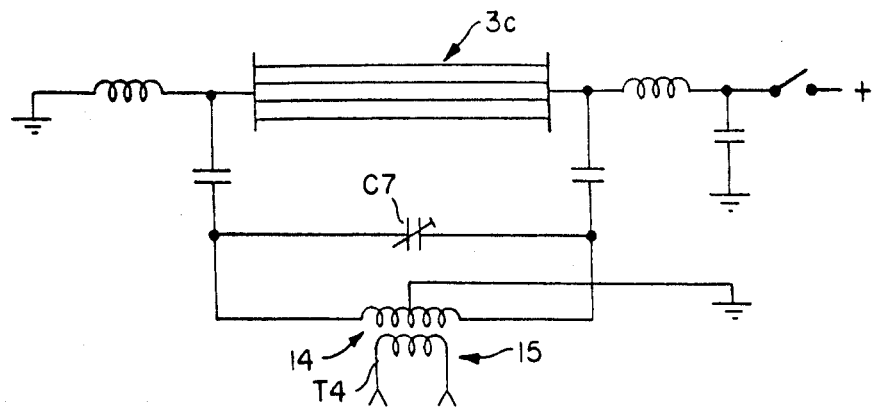

With the arrangement of FIG. 4, the heated rear window 3c forms with an inductance 14 a closed loop of push-pull configuration, and opposite sides of the window are connected to the power supply via RF chokes, or alternatively via parallel inductance/capacitance circuits.

The aerial connection is made via an inductive link 15 giving balanced outputs.

The aerial 3c is driven by r.f. signals fed to opposite ends thereof from the transmitter aerial feeder circuitry. The aerial 3c acts as an inductive impedance and is tuned to act as a resistive impedance, by means of the variable capacitor $C_7$, and is matched to the aerial feeder circuitry impedance by means of the transformer T4.

Figure 5:
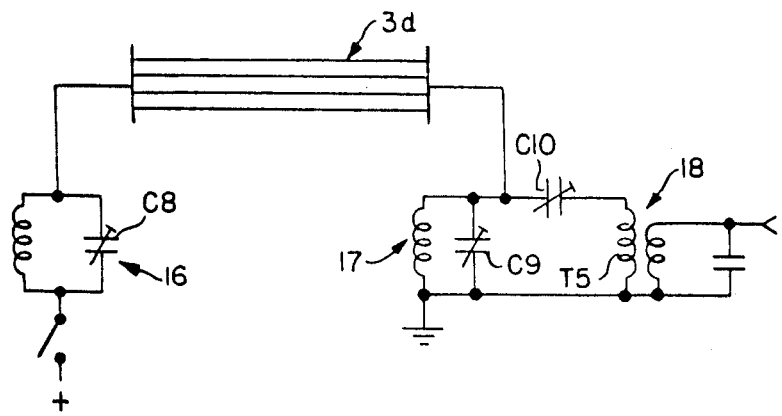

The arrangement of FIG. 5 is a modification of the arrangement of FIG. 2. Each power supply lead for the window 3d incorporates a respective parallel tuned circuit 16, 17 although if desired these may be replaced by a bifilar coil arrangement. The aerial matching circuit 18 may have air-gapped or cored coils in accordance with requirements.

R.f. signals are isolated from the supply circuit by means of the two circuits 16, 17 which are tuned with the variable capacitors $C_8$, $C_9$. The capacitive impedance of the aerial 3d is matched to the resistive impedance of the transmitter aerial feeder circuitry by means of the transformer T5 and the variable capacitor $C_{10}$ of the circuit 18, the capacitor $C_{10}$ in this case being in series with the aerial.

Figure 6:
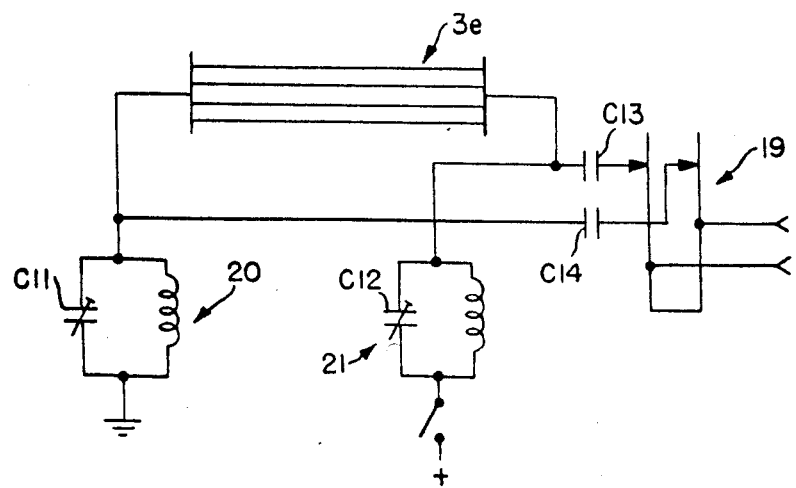

The arrangement of FIG. 6 is particularly suitable for VHF/UHF use and utilises a matching stub 19 having predetermined tapping points for matching the aerial impedance of the window 3e. The power supply is connected to the window 3e via parallel tuned circuits 20, 21.

R.f. signals are isolated from the supply circuit by means of the two circuits 20, 21 which are tuned with the variable capacitors $C_{11}$, $C_{12}$. The aerial 3e is driven by r.f. signals fed to opposite ends thereof from the transmitter aerial feeder circuitry. The aerial 3e acts as an inductive impedance and is tuned to act as a resistive impedance, by the series capacitors $C_{13}$, $C_{14}$, and is matched to the aerial feeder circuitry impedance by means of the stub.

It is of course to be understood that the invention is not intended to be restricted to the details of the above embodiments which are described by way of example only.

I claim:

1. An isolating and matching device to enable a heating element of an electrically heatable motor vehicle window, not designed specifically to be an antenna or aerial and essentially aperiodic and non-resonant at RF frequencies, to be used as a transmitting and/or receiving aerial, comprising in combination: separation circuitry means coupled with terminal leads of said heating element and with a motor vehicle D.C. power supply and operable to permit passage of heating current from said power supply to the said heating element while isolating or blocking passage of RF signals from said heating element to the said power supply, and matching circuitry means operative to effectively match the impedance of said heating element to an aerial input impedance of an aerial feeder circuit of a transmitting and/or receiving device to thereby effect efficient RF signal transmission and/or reception; said matching circuitry means being coupled with said terminal leads of said heating element and said aerial feeder circuit to form a closed loop circuit for the transmitted and/or received RF signals; wherein the closed loop circuit for the RF signals comprises said heating element and substantially a capacitively coupled impedance.

2. A device according to claim 1 wherein said capacitively coupled impedance comprises a matching stub having predetermined tapping points for matching the aerial impedance of the said heating element.

3. A device according to claim 1 wherein said RF signals comprise VHF or UHF signals.

4. A device according to claim 2 wherein said RF signals comprise VHF or UHF signals.

5. A device according to claim 1 wherein said terminal leads of the said heating element are connected with said motor vehicle D.C. power supply via parallel tuned circuits.

6. A device according to claim 2 wherein said terminal leads of the said heating element are connected with said motor vehicle D.C. power supply via parallel tuned circuits.

7. A device according to claim 3 wherein said terminal leads of the said heating element are connected with said motor vehicle D.C. power supply via parallel tuned circuits.

* * * * *